United States Patent
Leung et al.

(10) Patent No.: US 6,996,557 B1
(45) Date of Patent: Feb. 7, 2006

(54) METHOD OF OPTIMIZING SQL QUERIES WHERE A PREDICATE MATCHES NULLABLE OPERANDS

(75) Inventors: Ting Yu Leung, San Jose, CA (US); Tuong Chanh Truong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 09/504,086

(22) Filed: Feb. 15, 2000

(51) Int. Cl.
G06F 7/00 (2006.01)

(52) U.S. Cl. .............................................. 707/4
(58) Field of Classification Search ........... 707/1–8, 707/10, 100–104.1, 200–205, 538; 709/200, 709/201; 715/538
See application file for complete search history.

(56) References Cited

U.S. PATENT DOCUMENTS

| | | | | |
|---|---|---|---|---|
| 5,239,663 A | * | 8/1993 | Faudemay et al. | 340/146.2 |
| 5,724,570 A | * | 3/1998 | Zeller et al. | 707/3 |
| 5,761,657 A | * | 6/1998 | Hoang | 707/2 |
| 6,044,370 A | * | 3/2000 | Anfindsen | 707/2 |
| 6,154,876 A | * | 11/2000 | Haley et al. | 714/38 |
| 6,171,109 B1 | * | 1/2001 | Ohsuga | 434/118 |
| 6,199,063 B1 | * | 3/2001 | Colby et al. | 707/102 |

* cited by examiner

*Primary Examiner*—John Breene
*Assistant Examiner*—Harold E. Dodds, Jr.

(57) ABSTRACT

An optimization technique for SQL queries, a program storage device storing the optimization program, and an apparatus for optimizing a query is provided. A query is analyzed to determine whether it includes a predicate for matching nullable operands and, if so, it is transformed to return TRUE when all operands are NULLs. If the DBMS supports this new function, the predicate is marked. If not, the predicate is re-written into a CASE expression having two SELECT clauses. The query is then executed in the computer to efficiently retrieve data from the relational database.

39 Claims, 4 Drawing Sheets

METHOD OF OPTIMIZING SQL QUERIES WHERE A PREDICATE MATCHES NULLABLE OPERANDS

BACKGROUND OF THE INVENTION

1. Field of the Invention

This invention relates in general to database management systems performed by computers, and in particular to the optimization of SQL queries in a relational database management system where a null value is to be matched with a null value.

2. Description of Related Art

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO).

In RDBMS software all data is externally structured into tables. The SQL interface allows users to formulate relational operations on the tables either interactively, in batch files, or embedded in host language, such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement. One of the most common SQL queries executed by RDBMS software is the SELECT statement. In the SQL standard, the SELECT statement generally has the format: "SELECT <clause> FROM <clause > WHERE <clause > GROUP BY <clause > HAVING <clause > ORDER BY <clause>." The clauses generally must follow this sequence. Only the SELECT and FROM clauses are required and all other clauses are optional.

Generally, the result of a SELECT statement is a subset of data retrieved by the RDBMS software from one or more existing tables stored in the relational database, wherein the FROM clause identifies the name of the table or tables from which data is being selected. The subset of data is treated as a new table, termed the result table. The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause.

The search condition typically comprises one or more predicates, each of which specifies a comparison between two values from certain columns, constants or correlated values. Multiple predicates in the WHERE clause are typically connected by Boolean operators.

The SELECT statement may also include a grouping function indicated by the GROUP BY clause. The GROUP BY clause causes the rows in the intermediate result set to be grouped according to the values specified in the clause. A number of column or aggregate functions are also built into SQL, such as MAX (maximum value in column), MIN (minimum value in column), AVG (average of values in column), SUM (sum of values in column), and COUNT (number of rows).

Queries using aggregate expressions return as many result rows as there exist unique "result groups" in the source of the aggregation. A result group is defined as the set of values contained in the fields of a row corresponding to the list of columns or expressions specified in the GROUP BY clause of the query. The value of the aggregate function is the result of applying the function to the result of the contained expression for each row having the same result group.

Another operation permitted by SQL is the JOIN operation, which concatenates horizontally all or parts of two or more tables to create a new resulting table. The JOIN operation is implied by naming more than one table in the FROM clause of a SELECT statement.

An SQL query generally includes at least one predicate, which is an SQL expression that can assume a logical value of TRUE, FALSE, or UNKNOWN. A predicate typically either specifies a data range, tests for an existence condition, tests for equivalence, or performs a similar table comparison operation.

In RDBMSs, columns of any type can assume NULL (i.e., unknown) values. In RDBMS software, NULL values are properly handled using tri-value logic (i.e., TRUE, FALSE or UNKNOWN) for predicates, and SQL-based RDBMSs employ such logic.

Nested SQL statements may require tuple-by-tuple data manipulation in each subquery for evaluation of the complete statement. For example, each entry of a table column may need to be compared against each entry of a corresponding column in another table to determine if a SELECT operation should retrieve a table row. Such tuple-by-tuple operations are very inefficient and require simplification and optimization.

In an RDBMS system, users submit SQL queries. The optimizer in the RDBMS optimizes the SQL query and generates an efficient execution plan. Typically the optimizer adopts a cost-based approach wherein the optimizer generates many possible alternative execution plans, and selects the best/cheapest plan among those generated plans.

The present invention optimizes SQL queries where a NULL value is to be matched with another NULL value. Introduction of NULL values in SQL is an important concept and introduces many optimization challenges and difficulties. There has been substantial research that deals with the presence of null values, such as shown in the following publications.

W. Kim. "On Optimizing an SQL-like Nested Query." ACM TODS, Sep. 7, 1982. In this paper the author attempted to decorrelate correlated subquery with aggregation by replacing quantified subqueries with joins. However, the algorithms did not account for null values known as "count" bug. The research paper highlights the difficulties of handling and optimizing queries in presence of nulls.

In U.S. Pat. No. 5,590,324 "Optimization of SQL queries using universal quantifiers, set intersection, and max/min aggregation in the presence of nullable columns" the authors presented methods of query optimization involving nullable columns.

In one example, an INTERSECT-DISTINCT query can be converted into a join if at least one of the pair-wise columns (where corresponding columns from two tables are paired) is not nullable:

CREATE TABLE F1 (T1 INT NOT NULLABLE, T2 INT, T3 INT)

CREATE TABLE F2 (T1 INT, T2 INT NOT NULLABLE, T3 INT)
The following query:
SELECT T1, T2 FROM F1
INTERSECT DISTINCT
SELECT T1, T2 FROM F2
can be converted into the join query as follows:
SELECT DISTINCT F1.T1, F1.T2
FROM F1, F2
WHERE F1.T1=F2.T1 AND F1.T2=F2.T2

In another example quantified subqueries (e.g., using universal quantifiers such as ALL) can be converted into a join with proper handling of null values and empty result from the subquery. Since nullability can be propagated from subqueries or derived tables, this nullability propagation can enable other query transformation and optimization.

Some other publications include the exploitation of situations when a predicate becomes FALSE in the presence of null values. One example is given by the following left outer join query:
SELECT F1.T1, F2.T2
FROM F1 LEFT JOIN F2
ON F1.T1=F2.T1
WHERE F2.T3>0

By the definition of the left outer join, each row of table F1 will be matched against the table F2 using the join condition "F1.T1=F2.T1". If there is a match, the matching pair will be returned. If there is no match, the F1 row will be returned together with null values in F2 columns. In the situation where the column field F2.T3 contains a null value, the predicate "F2.T3>0" is FALSE. In this case the padded null rows resulted from the application of the left outer join will be filtered out by the WHERE clause, and hence, the left outer join can be converted into an inner join:
SELECT F1.T1, F2.T2
FROM F1, F2
WHERE F2.T3>0 AND F1.T1=F2.T1

According to the ANSI SQL standard definition of a NULL value, given a join predicate in Boolean factor:
F1.T1=F2.T1
the predicate is evaluated as FALSE when either join column is NULL. However, apparently no query optimization and performance research has dealt with the situation where a NULL value is to be matched with another NULL value.

The problem is best understood in the context of an example. The following tables and table content are created as:
CREATE TABLE T (T1 INT, T2 INT, T3 INT)
INSERT INTO T VALUES (NULL, 2, 3)
CREATE TABLE S (S1 INT, S2 INT, S3 INT)
INSERT INTO S VALUES (NULL, 4, 6)
In this case both tables have a row where the first column has a NULL value. Using the above database schema, the following query is considered:

(Q1)
SELECT *
FROM T, S
WHERE T1=S1

According to the ANSI SQL semantics, the join query will not return any rows because the column T1 has a NULL value (and S1 column has a NULL value) and the comparison with a NULL value results in FALSE. However, there are times that users may want to match a null value with another null value. To achieve this semantics in SQL, users must write the following query:

(Q2)
SELECT *
FROM T, S
WHERE T1=S1 OR (T1 IS NULL AND S1 IS NULL)

This query will produce a row matching of a NULL value against a NULL value because the predicate "T1 IS NULL AND S1 IS NULL" is TRUE in the OR predicate. Thus, the row has the following values in its columns:

| S1 | S2 | S3 | T1 | T2 | T3 |
|---|---|---|---|---|---|
| NULL | 2 | 3 | NULL | 4 | 6 |

However, the execution of the join predicate of this query is fairly complex, when it is given in the form:
T1=S1 OR (T1 IS NULL AND S1 IS NULL)
Unlike an ordinary join predicate which has a simple form of "LHS=RHS", the above-mentioned complex join predicate generally requires the use of the nested loop join method, because other join methods, such as hash join and sort-merge join, typically require the predicate in the form of a simple equality predicate ("T1=S1") for the value matching, ordering and sorting. Therefore, such complex predicates restrict the DBMS optimizer because the number of alternative evaluation strategies is very limited. Typically, only the table scan and nested loop joins are the allowed operations.

Moreover, there are other examples which have a limited optimization success. One such example is a query that uses a complex correlation predicate instead of a join predicate:

(Q3)
UPDATE T
SET T2 = (SELECT MAX(S2)
 FROM S
 WHERE T1=S1 OR (T1 IS NULL
  AND S1 IS NULL))

In the query Q3, it is required to find the maximal value of column S2 for each value of T1, even if both T1 and S1 are NULL values, and to use this maximal value for updating the column T2. Using a conventional optimizer, the table T will be scanned, and for each row of the table T the column T1 value will be used to find a match in the table S, where the matching condition is "T1=S1 OR (T1 IS NULL AND S1 IS NULL)". Like the join query Q2 shown above, the number of alternative access plans is often restricted due to the complexity of the correlation predicate. In this particular example, a table scan of table S has to be performed for every correlation value T1, resulting in a very poor performance.

There is further need in the art for optimization techniques of queries where a NULL value is to be matched with another NULL value.

SUMMARY OF THE INVENTION

The foregoing and other objects, features, and advantages of the present invention will be apparent from the following detailed description of the preferred embodiment which makes reference to several drawing figures.

One embodiment of the present invention is a method of optimizing a query in a computer, the query being performed by the computer to retrieve data from a relational database stored in an electronic storage device coupled to the computer. The method receives a query having a subquery containing a predicate for matching a nullable left-hand-size (LHS) operand to a nullable right-hand-size (RHS) operand. The query predicate is presented in the form of "LHS operand=RHS operand OR (LHS operand IS NULL AND RHS operand IS NULL)". The method then transforms the subquery into a simple predicate such that the rewritten subquery is TRUE in a presence of a NULL value in all operands, and executes the transformed query in the computer to retrieve data from the relational database.

The subquery transforming step includes the step of re-writing the subquery by forming a "CASE" expression having two subqueries. The first subquery is executed when the LHS operand is NULL and it has an "RHS operand IS NULL" predicate. The second subquery is executed when the LHS operand is not NULL and it has an "LHS operand= RHS operand" predicate. The step of executing the transformed query includes the step of determining whether to execute the first or second subquery by evaluating whether the LHS operand has a NULL value. If so, it checks the RHS operand for nullness. If not so, it checks whether the LHS operand has the same value as the RHS operand. The predicate is interpreted as TRUE in a presence of a NULL value in both operands.

Another preferred embodiment of the present invention includes a program storage device storing this optimization program. Yet another preferred embodiment of the present invention includes an apparatus for optimizing a query according to this optimization method.

Still another embodiment of the present invention is a method of optimizing a query in a computer, when the DBMS is modified to mark the predicate matching nullable operands. The method receives a query containing a predicate for matching a nullable left-hand-size (LHS) operand to a nullable right-hand-size (RHS) operand. The predicate is transformed into a simple predicate that includes an operator "= =" defining a possible simultaneous presence of a NULL value in both operands. Next, the method executes the transformed query in the computer to retrieve data from the relational database such that the marked predicate is TRUE in a presence of a NULL value in both operands.

The step of executing the transformed query determines whether the predicate has the operator "= =", and if so checks the LHS and RHS operands for nullness, and interprets the predicate as TRUE, in a presence of a NULL value in both operands.

Another preferred embodiment of the present invention includes a program storage device storing this optimization program. Still another preferred embodiment of the present invention includes an apparatus for optimizing a query according to this optimization method.

Yet another embodiment of the present invention is a method of optimizing a query in a computer. The method receives a query containing a predicate for matching a nullable left-hand-size (LHS) operand to a nullable right-hand-size (RHS) operand. The query predicate is presented in the form of "LHS operand=RHS operand OR (LHS operand IS NULL AND RHS operand IS NULL)". Next, the method transforms the query into a simple predicate and marks it as having the operator "= =" and executes the transformed query in the computer to retrieve data from the relational database such that the marked predicate is TRUE in a presence of a NULL value in both operands. The step of executing the transformed query step determines whether the predicate is marked, and if so checks the LHS and RHS operands for nullness, and interprets the predicate as TRUE, in a presence of a NULL value in both operands.

Another preferred embodiment of the present invention includes a program storage device storing this optimization program. Yet another preferred embodiment of the present invention includes an apparatus for optimizing a query according to this optimization method.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized and structural and functional changes may be made without departing from the scope of the present invention.

There is need to further optimize and improve query performance of complex queries, when a NULL value has to be matched to a NULL value. The present invention discloses a method, apparatus and computer program carrier (data storage device) for optimizing SQL queries. A query is analyzed to determine whether it includes matching of a NULL value from one field to a NULL value from another field. The query is then transformed, which allows generation of more efficient execution plans for retrieving data from the relational database.

Hardware and Software Environment

Figure 1:
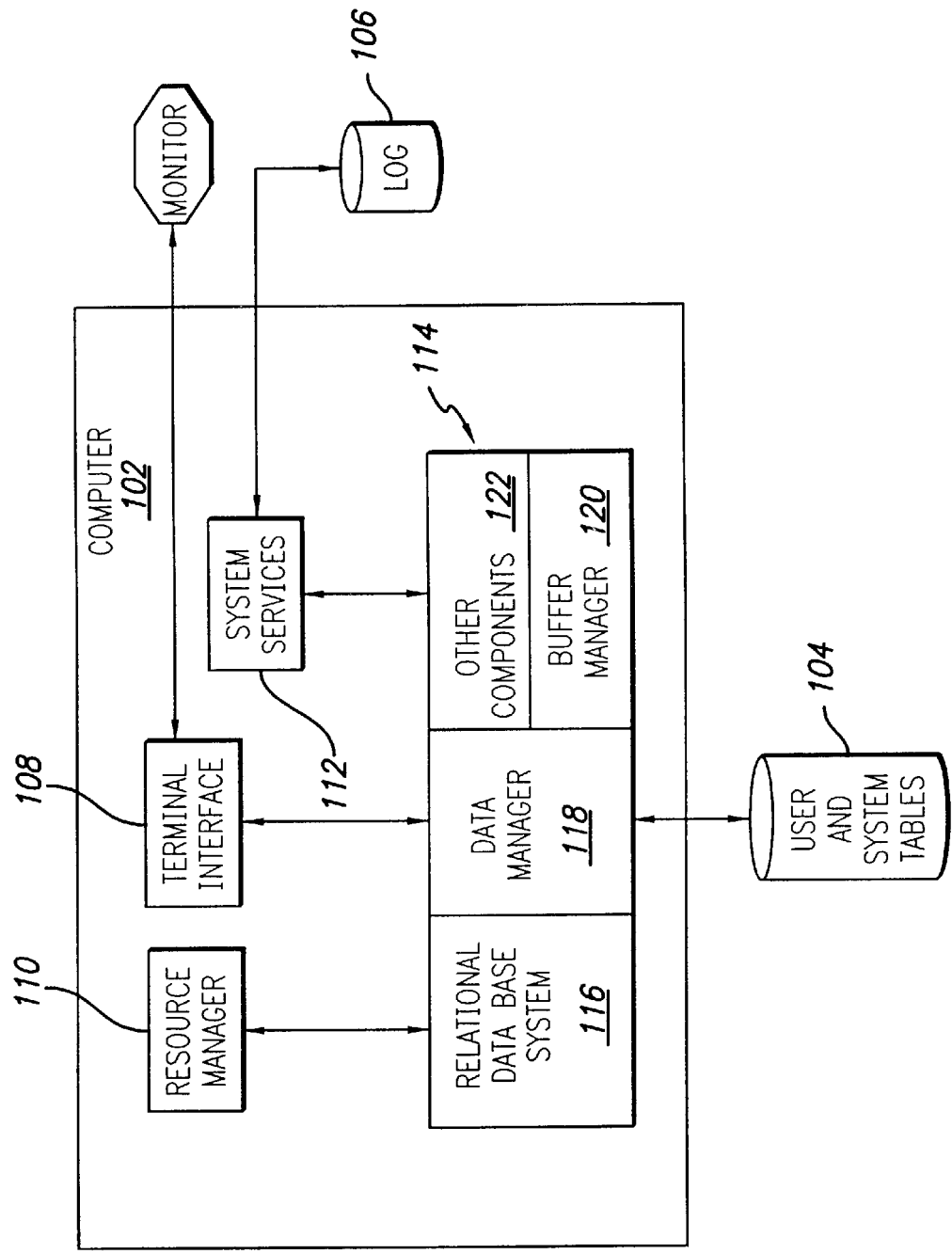
FIG. 1 illustrates a computer hardware and software environment usable in the present invention.

FIG. 1 illustrates an exemplary computer hardware environment that could be used with the present invention. In the exemplary environment, a computer system 102 is comprised of one or more processors with computer memory, connected to one or more electronic storage devices 104 and 106, such as disk drives, that store one or more relational databases. These drives may comprise, for example, optical disk drives, magnetic tapes and/or semiconductor memory.

Operators of the computer system 102 use a standard operator terminal interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software that uses SQL, and may similarly be applied to non-SQL queries.

As illustrated in FIG. 1, the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems, Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e., definition, access control, retrieval, and update of user and system data.

Figure 2:
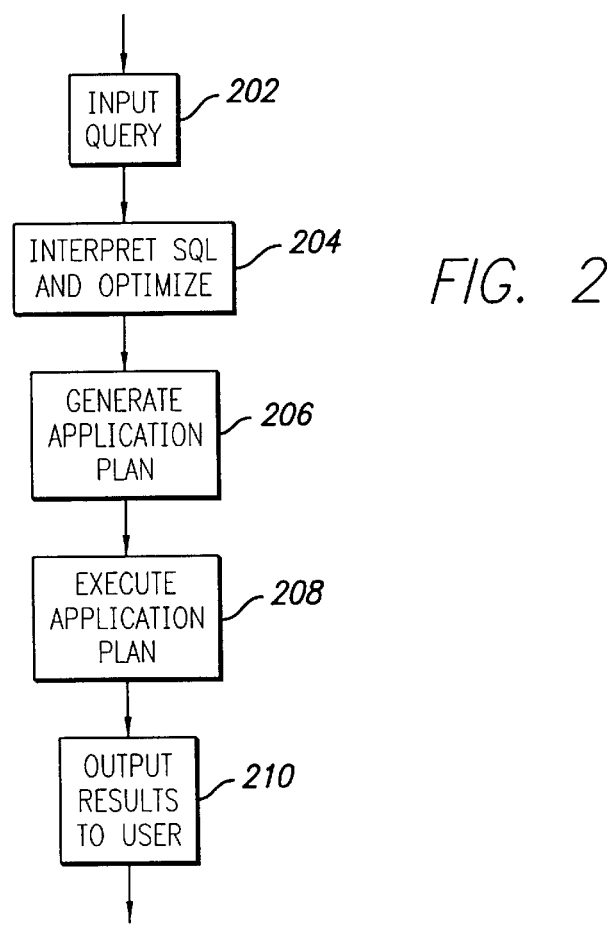
FIG. 2 is a flowchart illustrating the steps for the interpretation and execution of SQL statements in an interactive environment, usable to the present invention.

FIG. 2 is a flowchart illustrating the steps necessary for the interpretation and execution of SQL statements in an interactive environment, according to the present invention. Block 202 represents the step of accepting the user's input of SQL statements into the computer system 102. Block 204 represents the step of compiling or interpreting the SQL statements. An optimization function within block 204 may transform the SQL query in a manner described in more detail later in this specification. Block 206 represents the step of generating a compiled set of runtime structures called an application plan from the compiled SQL statements. Generally, the SQL statements received as input from the user specify only the data that the user wants, but not the instructions on how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
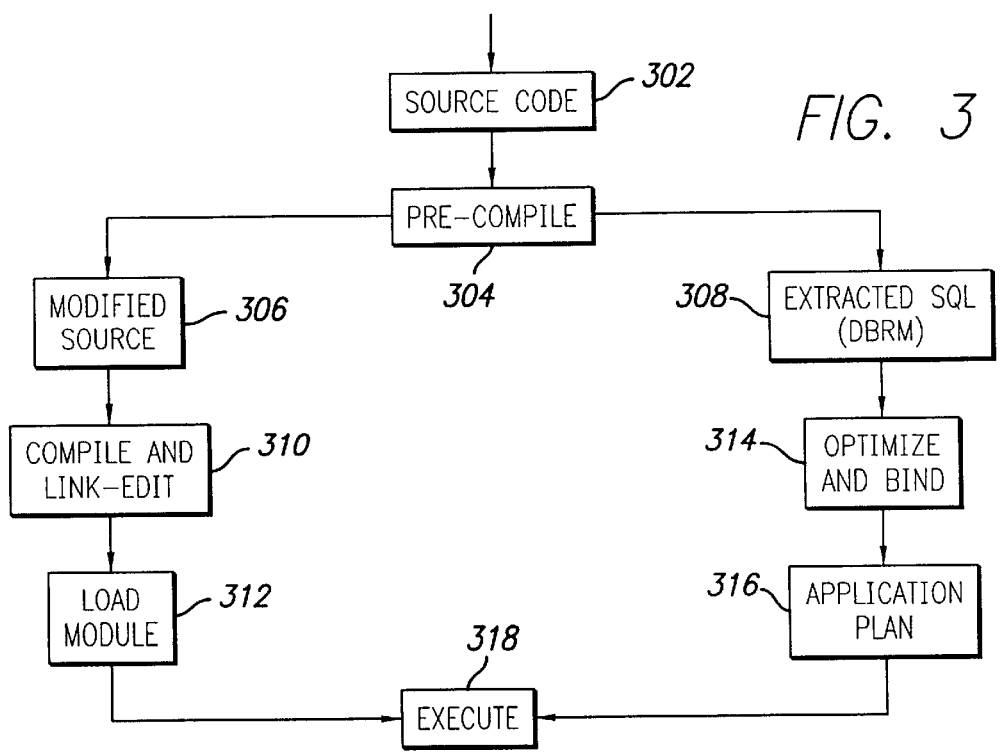
FIG. 3 is a flowchart illustrating the steps for the interpretation and execution of SQL statements in an embedded source code, usable in the present invention.

FIG. 3 is a flowchart illustrating the steps necessary for the interpretation and execution of SQL statements embedded in source code, according to the present invention. Block 302 represents program source code containing a host language (such as COBOL or C) and embedded SQL statements. The program source code is then input to a precompile step 304. There are two outputs from the precompile step 304: a modified source module and a Database Request Module (DBRM) 308. The modified source module 306 contains host language calls to DB2, which the precompile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 1, the SQL statements from the program source code 302 specify only the data that the user wants, but not how to get to it. The optimize and bind step 314 may optimize the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

Those skilled in the art will recognize that any combination of components, including computer hardware, peripherals and other devices, computer system software programs and application programs may be used to implement the present invention, so long as similar functions are performed thereby. Many modifications of the proposed preferred embodiments may be made without departing from the scope of the present invention.

SQL Optimization

Figure 4:
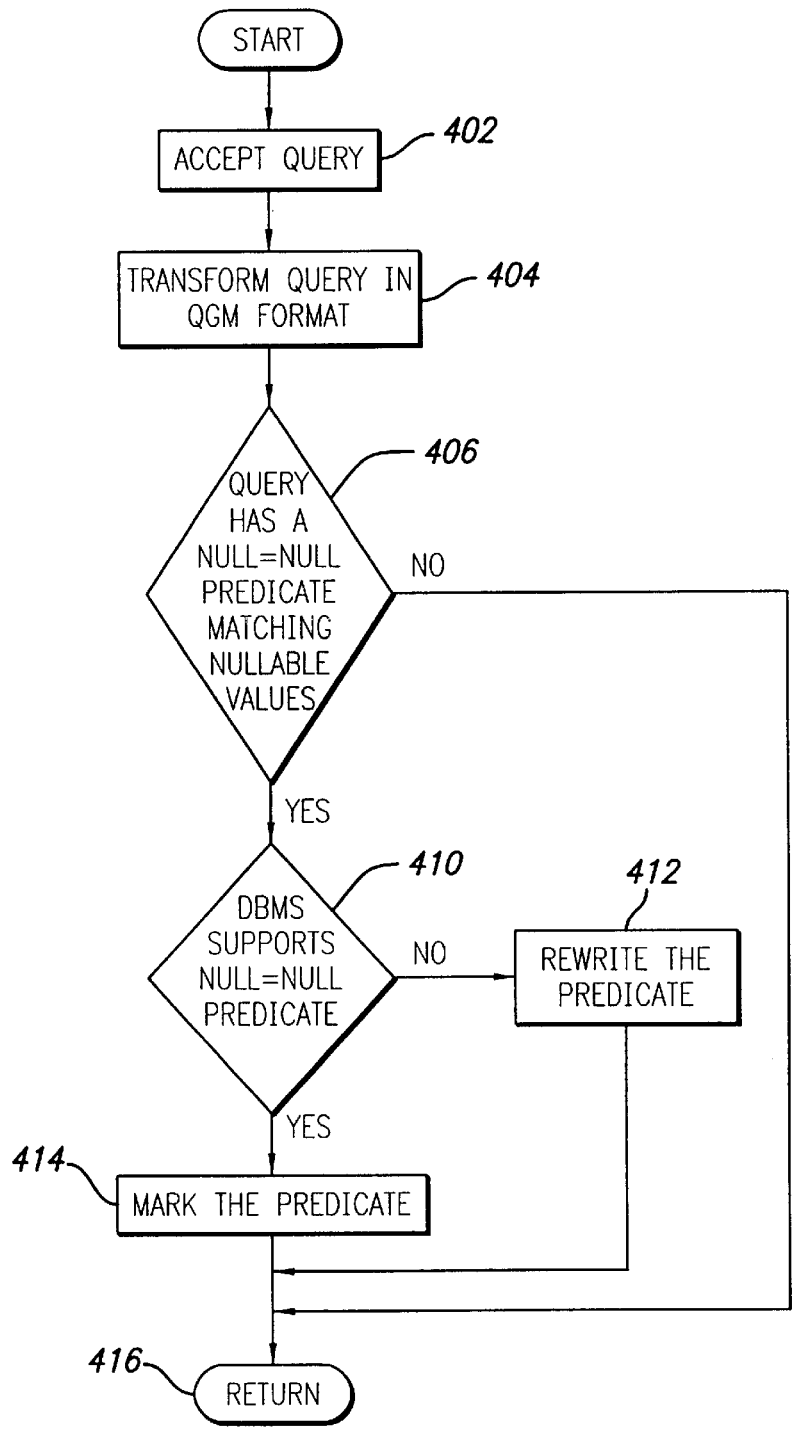
FIG. 4 is a flowchart illustrating the method of optimizing SQL queries in steps 204 of FIG. 2 and 314 of FIG. 3 according to the present invention.

FIG. 4 is a flowchart illustrating the method of optimizing SQL queries in steps 204 of FIG. 2 and 314 of FIG. 3 according to the present invention. Block 402 represents the acceptance of the SQL query. Block 404 represents the translation of the query into a Query Graph Model (QGM). Block 406–416 represent the improved optimization technique for evaluation of predicates matching nullable operands. Block 416 represents a return point from the optimization technique. In the present invention several optimization techniques are presented which are able to improve the query performance for complex queries with operands where a NULL value is to be matched with a NULL value.

The operation of the present invention can be best understood in the context of the following examples. One such example is the above-mentioned query Q3, that uses a complex correlation predicate:

```
(Q3)
    UPDATE   T
    SET      T2 =   (SELECT   MAX(S2)
                    FROM      S
                    WHERE     T1=S1 OR (T1 IS NULL
                              AND S1 IS NULL))
```

In this query, it is required to find the maximal value of column S2 for each value of T1, even if both T1 and S1 are NULL values, and to use this maximal value for updating the column T2.

As noted above, according to the ANSI SQL semantics, a join between column T1 and S1 will not return any rows if either column value has a NULL value. However, there are times that users may want to match a null value with another null value. To achieve this semantics in SQL, users must write the correlation predicate in WHERE clause as:

T1=S1 OR (T1 IS NULL AND S1 IS NULL)

If either column T1 or S1 is defined as NOT nullable, then the predicate can be simplified as:

T1=S1

The problem occurs when both columns T1 and S1 are defined nullable and have a NULL value in the compared fields used in the predicate T1=S1.

This problem is eliminated when there is another predicate in the same query involving either the column T1 or the column S1, which requires a non-nullable value, so that the rows with NULL values in the columns T1 and S1 will be filtered out. Then the predicate can be simplified as:

T1=S1

For example, the following predicates:

T1=S1 OR(T1 IS NULL AND S1 IS NULL) and T1>0 can be simplified as:

T1=S1 and T1>0

However, the preferred embodiment of the present invention is useful when considering the following correlation predicate:

T1=S1 OR (T1 IS NULL AND S1 IS NULL)

when there is no other predicate that can filter out rows of both tables T and S, and both columns are nullable.

According to one method embodiment of the present invention, when both operands which are compared in a predicate are defined as nullable, then the predicate is transformed into a new, user-defined Boolean function, which is semantically defined as "null=null" function. This user-defined Boolean function is defined to return the value TRUE if:

1. both operands which are compared in the predicate have a NULL value, or
2. neither operand has a NULL value and both have the same value, according to the SQL language semantic rules for operator "=".

According to one preferred embodiment of the present invention the query predicate is transformed into a simple predicate, user-defined Boolean function "null=null". This simple predicate is implemented by introducing, preferably in the query optimizer, a special, user-defined operator "= =". This operator alerts the DBMS query execution software, which is modified for this purpose, to test the nullable operands of this predicate.

In another preferred embodiment of the present invention the query predicate is transformed into a simple predicate, user-defined Boolean function "null=null". The standard system-defined operator "=" is used in this predicate, and the DBMS query optimization software is modified to mark the predicate by setting a special flag. This flag alerts the DBMS query execution software, which is modified for this purpose, to test the nullable operands of this predicate.

In either case, the DBMS optimizer treats this function as a regular, system-defined operator "=" operator, and can consider all possible access plans and join methods during the optimization process, including hash join and sort-merge join. During the run-time query execution, the setting of the flag requires the query processor to return TRUE when both operands have the value NULL.

The optimization techniques of the present invention require the DBMS system to be extended to support either user-defined Boolean operator "= =" or the modified system-defined operator "=", or support both, and to mark the predicate as returning a TRUE value when a NULL value is being compared to another NULL value. This can be accomplished in the query compiler, defined in step 204 of FIG. 2 and 314 of FIG. 3. Additionally, at the predicate execution time, the runtime engine, defined in steps 208 of FIG. 2 and 318 of FIG. 3, modifies its execution to observe whether a predicate is marked with the operator "= =" or a flag, and, before it proceeds, compares the left and right hand side operands, to check if both operands have a NULL value and, if so, it returns TRUE. If the DBMS runtime engine supports the "null=null" semantic function, either via user-defined operator "= 32 " or modified system-defined "=" operator, the query Q3 can be rewritten as:

```
(Q3')
UPDATE T
   SET T2 = (SELECT MAX(S2)
             FROM S
             WHERE T1 = = S1)
```

Additionally, if an index is defined on column S1 of the table S, the correlated subquery can be efficiently evaluated for each row of table T by matching via index access, and the query execution time is significantly reduced.

In yet another embodiment of the present invention the query with the predicate for matching the operands having a NULL value is transformed. Query transformation is used, for example, when the DBMS software modification is not possible. In this case the query Q3 can be re-written as follows, using the existing database engine primitives to avoid the complex join condition of query Q3:

```
(Q3")
UPDATE T
   SET T2 = (CASE WHEN T1 IS NULL
             THEN (SELECT MAX(S2)
                   FROM S
                   WHERE S1 IS NULL)
             ELSE (SELECT MAX(S2)
                   FROM S
                   WHERE T1 =S1) END)
```

The above query transformation essentially breaks down the original correlated subquery of (Q3) into two separate subqueries:

```
      S1: SELECT MAX(S2)
          FROM S
          WHERE S1 IS NULL
and
      S2: SELECT MAX(S2)
          FROM S
          WHERE T1 =S1
```

Only one subquery is executed during the run-time, depending on whether the value in column T1 is NULL or not. If T1 has a NULL value, then the original correlation predicate:

T1=S1 OR (T1 IS NULL AND S1 IS NULL)

is equivalent to and thus it can be simplified as:

S1 IS NULL

Therefore, the first subquery only selects tuples where both columns T1 and S1 have a NULL value.

If T1 has a non-NULL value, the original correlation predicate is equivalent to:

T1=S1 and in this case the tuples are selected if they do not have NULLs either in the column T1 or in the column S1, and if they have the same value in their columns (T1=S1). In both subqueries, indexes can be exploited because the rewritten correlation predicates are much simpler.

This preferred embodiment of the present invention can be defined with a rule that states that a correlated subquery with a predicate for matching nullable operands (denoted as Correlation-operand and Local-operand) can be transformed into two subqueries using a CASE expression. The first subquery is executed when the correlation column has a NULL value (i.e., "Correlation-operand is NULL"), and in the subquery the correlation predicate becomes "Local-operand is NULL". The second subquery is executed when the first operand has a non-NULL value, and correlation predicate becomes "Correlation-operand Local-operand".

The transformed query is treated in the DBMS optimizer as a regular query, and all possible access plans and join/access methods can be considered during the optimization process. Additionally, the first subquery S1 is a scalar subquery, which is not correlated to any other query block and thus this subquery is evaluated only once. Furthermore, with this transformation an index scan would improve the performance, if there is an index on column S1 of the table S, and all possible access plans can be considered during query planning.

It should be noted that the approach of DBMS extension provides the query Q3' which is more efficient than the query Q3" because there is only one subquery in the query Q3'.

FIG. 4 is the flowchart illustrating the logic of optimizing SQL queries according to the present invention. Block 406 represents the RDMBS software checking whether a query has a predicate for matching nullable values. Block 410 represents the RDBMS software for performing the test on whether the DBMS supports the predicate for matching nullable values. If such predicate is supported, the predicate is rewritten into a simple form and marked with "null=null" semantics in block 414. If not, the whole query is rewritten in block 412, according to the steps shown in FIG. 5.

Figure 5:
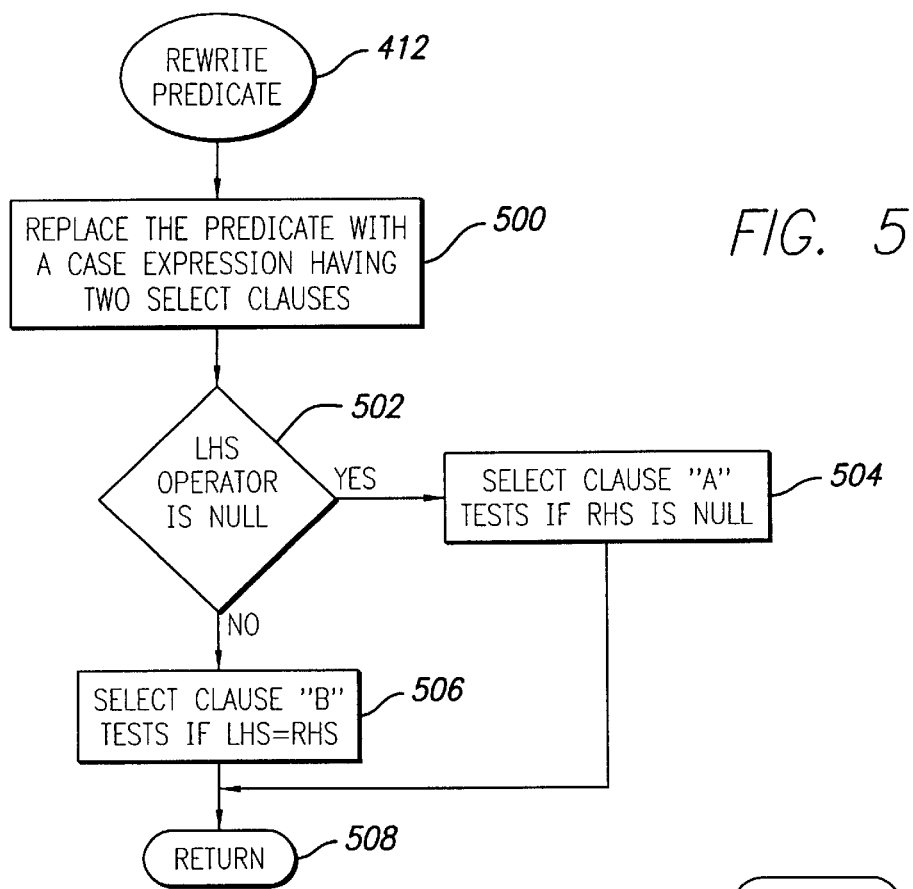
FIGS. 5–6 are flowcharts illustrating the logic of the method of optimizing SQL series according to the present invention.

FIG. 5 is the flowchart illustrating the logic of optimizing SQL queries according to the present invention, used to rewrite the subquery. Block 500 represents the RDMBS software for replacing the subquery with a CASE expression having two subqueries. In the CASE expression, the left-hand-side operand LHS is firstly tested for NULL, as shown in block 502, and the first subquery becomes, in block 504, a predicate where the right-hand-side operand is also tested for NULL value. In block 506, the second subquery tests whether LHS=RHS, according to the SQL semantics, to be used to select tuples that do not have NULL in either of the columns T1 and S1. The routine returns in step 508.

Figure 6:
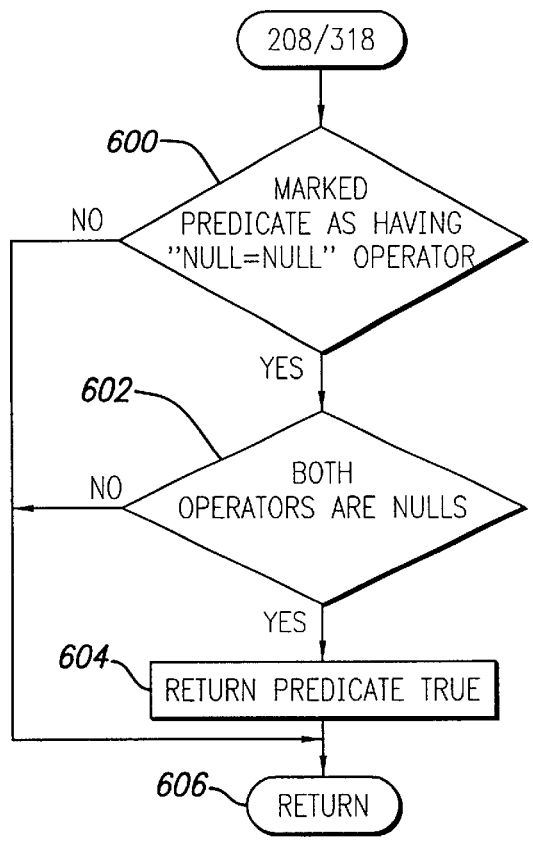

FIG. 6 is the flowchart illustrating the logic of modified DBMS run-time engine to execute according to the present invention. This routine is performed in steps 208 of FIG. 2 and 318 of FIG. 3. Block 600 represents the RDMBS software for testing whether the predicate is marked as having the NULL=NULL operator. If so, both operands are tested for NULLs, as shown in block 602. The predicate returns TRUE if all operands are NULLs. Otherwise the routine returns in step 606, where the predicate will be evaluated according to the SQL semantics, i.e., if either operand has a null value, the predicate is FALSE.

The foregoing description of the preferred embodiments of the present invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing a query in a computer, the query being performed by the computer to retrieve data from a relational database stored in an electronic storage device coupled to the computer, the method comprising the steps of:

(a) receiving a query having a subquery containing a predicate for matching a nullable left-hand-size (LHS) operand to a nullable right-hand-size (RHS) operand, the query predicate presented in the form of "LHS operand=RHS operand OR (LHS operand IS NULL AND RHS operand IS NULL)";

(b) transforming the subquery such that the re-written subquery has a simple predicate LHS=RHS returning TRUE value in a presence of a NULL value in all said operands, thereby enabling an optimizer to allow all access methods; and (c) executing the transformed query in the computer to retrieve data from the relational database.

2. The method according to claim 1, wherein the subquery transforming step comprises the step of re-writing the subquery by forming a "CASE" expression having two subqueries wherein:

the first subquery is executed when the LHS operand is NULL and having an "RHS operand IS NULL" predicate, and the second subquery is executed when the LHS operand is not NULL and having an "LHS operand=RHS operand" predicate.

3. The method according to claim 2, wherein the executing the transformed query step comprises the following steps:

determining whether to execute the first or second subquery by evaluating whether the LHS operand having a NULL value, if so, checking the RHS operand for nullness, or if not so, checking whether the LHS operand has the same value as the RHS operand, and interpreting the predicate as TRUE, in a presence of a NULL value in both operands.

4. The method according to claim 1, wherein the query transforming step is applied during a query plan compilation phase of query processing.

5. The method according to claim 1, wherein the query transforming step is applied during a query rewrite phase of query processing.

6. An apparatus for optimizing a query, comprising:

a computer having an electronic storage device coupled thereto for storing a relational database, the query being performed by the computer to retrieve data from the relational database;

means, performed by the computer, for receiving a query having a subquery containing a predicate for matching a nullable left-hand-size (LHS) operand to a nullable right-hand-size (RHS) operand, the query predicate presented in the form of "LHS operand=RHS operand OR (LHS operand IS NULL AND RHS operand IS NULL)";

means, performed by the computer, for transforming the subquery such that the rewritten subquery has a simple predicate LHS=RHS returning TRUE value in a presence of a NULL value in all said operands, thereby enabling an optimizer to allow all access methods; and means, performed by the computer, for executing the transformed query in the computer to retrieve data from the relational database.

7. The apparatus according to claim 6, wherein the means for transforming the subquery comprises the means for re-writing the subquery by forming a "CASE" expression having two subqueries wherein:

the first subquery is executed when the LHS operand is NULL and having an "RHS operand IS NULL" predicate, and the second subquery is executed when the LHS operand is not NULL and having an "LHS operand=RHS operand" predicate.

8. The apparatus according to claim 7, wherein the means for executing the transformed query comprises:
means for determining whether to execute the first or second subquery by evaluating whether the LHS operand having a NULL value,
means for checking the RHS operand for nullness,
means for checking whether the LHS operand has the same value as the RHS operand, and
means for interpreting the predicate as TRUE, in a presence of a NULL value in both operands.

9. The apparatus according to claim 6, wherein the means for transforming the query is applied during a query plan compilation phase of query processing.

10. The apparatus according to claim 6, wherein the means for transforming the query is applied during a query rewrite phase of query processing.

11. A program storage device readable by a computer tangibly embodying a program of instructions executable by the computer to perform method steps for optimizing a query, the query being performed by the computer to retrieve data from a relational database stored in an electronic storage device coupled to the computer, the method comprising the steps of:
(a) receiving a query having a subquery containing a predicate for matching a nullable left-hand-size (LHS) operand to a nullable right-hand-size (RHS) operand, the query predicate presented in the form of "LHS operand=RHS operand OR (LHS operand IS NULL AND RHS operand IS NULL)";
(b) transforming the subquery such that the rewritten subquery has a simple predicate LHS=RHS returning TRUE value in a presence of a NULL value in all said operands, thereby enabling the optimizer to allow all access methods; and
(c) executing the transformed query in the computer to retrieve data from the relational database.

12. The method according to claim 11, wherein the subquery transforming step comprises the step of re-writing the subquery by forming a "CASE" expression having two subqueries, wherein:
the first subquery is executed when the LHS operand is NULL and having an "RHS operand IS NULL" predicate, and
the second subquery is executed when the LHS operand is not NULL and having an "LHS operand=RHS operand" predicate.

13. The method according to claim 12, wherein the executing the transformed query step comprises the following steps:
determining whether to execute the first or second subquery by evaluating whether the LHS operand having a NULL value,
if so, checking the RHS operand for nullness, or
if not so, checking whether the LHS operand has the same value as the RHS operand, and interpreting the predicate as TRUE, in a presence of a NULL value in both operands.

14. The method according to claim 11, wherein the query transforming step is applied during a query plan compilation phase of query processing.

15. The method according to claim 11, wherein the query transforming step is applied during a query rewrite phase of query processing.

16. A method of optimizing a query in a computer, the query being performed by the computer to retrieve data from a relational database stored in an electronic storage device coupled to the computer, the method comprising the steps of:
(a) receiving a query containing a predicate for matching a nullable left-hand-size (LHS) operand to a nullable right-hand-size (RHS) operand, the query predicate presented in the form of "LHS operand=RHS operand OR (LHS operand IS NULL AND RHS operand IS NULL)";
(b) transforming the predicate into a simple predicate LHS= =RHS including an operator "= =" defining a possible simultaneous presence of a NULL value in the LHS and RHS operand, thereby enabling an optimizer to allow all join methods and access methods; and
(c) executing the transformed query in the computer to retrieve data from the relational database such that the marked predicate is TRUE in a presence of a NULL value in the LHS and RHS operand.

17. The method according to claim 16, wherein the executing the transformed query step comprises the following steps:
determining whether the predicate has the operator "= =",
checking the LHS and RHS operand for nullness, and
interpreting the predicate as TRUE, in a presence of a NULL value in both operands.

18. The method according to claim 16, wherein the query transforming step is applied during a query plan optimization phase of query processing.

19. The method according to claim 16, wherein the query transforming step is applied during a query rewrite phase of query processing.

20. An apparatus for optimizing a query, comprising:
a computer having an electronic storage device coupled thereto for storing a relational database, the query being performed by the computer to retrieve data from the relational database;
means, performed by the computer, for receiving a query containing a predicate for matching a nullable left-hand-size (LHS) operand to a nullable right-hand-size (RHS) operand, the query predicate presented in the form of "LHS operand RHS=operand OR (LHS operand IS NULL AND RHS operand IS NULL)";
means, performed by the computer, for transforming the predicate into a simple predicate LHS= =RHS including an operator "= =" defining a possible simultaneous presence of a NULL value in the LHS and RHS operand, thereby enabling an optimizer to allow all join methods and access methods; and
means, performed by the computer, for executing the transformed query in the computer to retrieve data from the relational database such that the marked predicate is TRUE in a presence of a NULL value in the LHS and RHS operand.

21. The apparatus according to claim 20, wherein the means for executing the transformed query comprises:
means, performed by the computer, for determining whether the predicate has the operator "= =",
means, performed by the computer, for checking the LHS and RHS operand for nullness; and
means, performed by the computer, for interpreting the predicate as TRUE, in a presence of a NULL value in both operands.

22. The apparatus according to claim 20, wherein the means for transforming the query is applied during a query plan optimization phase of query processing.

23. The apparatus according to claim 20, wherein the means for transforming the query is applied during a query rewrite phase of query processing.

24. A program storage device readable by a computer tangibly embodying a program of instructions executable by the computer to perform method steps for optimizing a query, the query being performed by the computer to retrieve data from a relational database stored in an electronic storage device coupled to the computer, the method comprising the steps of:
   (a) receiving a query containing a predicate for matching a nullable left-hand-size (LHS) operand to a nullable right-hand-size (RHS) operand, the query predicate presented in the form of "LHS operand=RHS operand OR (LHS operand IS NULL AND RHS operand IS NULL)";
   (b) transforming the predicate into a simple predicate LHS= =RHS including an operator "= =" defining a possible simultaneous presence of a NULL value in the LHS and RHS operand, thereby enabling an optimizer to allow all join methods and access methods; and
   (c) executing the transformed query in the computer to retrieve data from the relational database such that the marked predicate is TRUE in a presence of a NULL value in the LHS and RHS operand.

25. The method according to claim 24, wherein the executing the transformed query step comprises the following steps:
   (a) determining whether the predicate has the operator "= =";
   (b) checking the LHS and RHS operand for nullness; and
   (c) interpreting the predicate as TRUE, in a presence of a NULL value in both operands.

26. The method according to claim 24, wherein the query transforming step is applied during a query plan optimization phase of query processing.

27. The method according to claim 24, wherein the query transforming step is applied during a query rewrite phase of query processing.

28. A method of optimizing a query in a computer, the query being performed by the computer to retrieve data from a relational database stored in an electronic storage device coupled to the computer, the method comprising the steps of:
   (a) receiving a query containing a predicate for matching a nullable left-hand-size (LHS) operand to a nullable right-hand-size (RHS) operand, the query predicate presented in the form of "LHS operand=RHS operand OR (LHS operand IS NULL AND RHS operand IS NULL)";
   (b) transforming the predicate into a simple predicate LHS=RHS;
   (c) marking the predicate as defining a possible simultaneous presence of a NULL value in the LHS and RHS operand, thereby enabling an optimizer to allow all join methods and access methods; and
   (d) executing the query in the computer to retrieve data from the relational database such that the marked predicate is TRUE in a presence of a NULL value in the LHS and RHS operand.

29. The method according to claim 28, wherein the executing the query step comprises the following steps:
   determining whether the predicate is marked;
   checking the LHS and RHS operand for nullness; and
   interpreting the predicate as TRUE, in a presence of a NULL value in the LHS and RHS operand.

30. The method according to claim 28, wherein the query predicate marking step is applied during a query plan optimization phase of query processing.

31. The method according to claim 28, wherein the query predicate marking step is applied during a query rewrite phase of query processing.

32. An apparatus for optimizing a query, comprising:
   a computer having an electronic storage device coupled thereto for storing a relational database, the query being performed by the computer to retrieve data from the relational database;
   means, performed by the computer, for receiving a query containing a predicate for matching a nullable left-hand-size (LHS) operand to a nullable right-hand-size (RHS) operand, the query predicate presented in the form of "LHS operand=RHS operand OR (LHS operand IS NULL AND RHS operand IS NULL)";
   means, performed by the computer, for transforming the predicate into a simple predicate LHS=RHS;
   means, performed by the computer, for marking the predicate as defining a possible simultaneous presence of a NULL value in the LHS and RHS operand, thereby enabling an optimizer to allow all join methods and access methods; and
   means, performed by the computer, for executing the query in the computer to retrieve data from the relational database such that the marked predicate is TRUE in a presence of a NULL value in the LHS and RHS operand.

33. The apparatus according to claim 32, wherein the means for executing the query comprises:
   means, performed by the computer, for determining whether the predicate is marked;
   means, performed by the computer, for checking the LHS and RHS operand for nullness; and
   means, performed by the computer, for interpreting the predicate as TRUE, in a presence of a NULL value in the LHS and RHS operand.

34. The apparatus according to claim 32, wherein the means for marking the query predicate is applied during a query plan optimization phase of query processing.

35. The apparatus according to claim 32, wherein the means for marking the query predicate is applied during a query rewrite phase of query processing.

36. A program storage device readable by a computer tangibly embodying a program of instructions executable by the computer to perform method steps for optimizing a query, the query being performed by the computer to retrieve data from a relational database stored in an electronic storage device coupled to the computer, the method comprising the steps of:
   (a) receiving a query containing a predicate for matching a nullable left-hand-size (LHS) operand to a nullable right-hand-size (RHS) operand, the query predicate presented in the form of "LHS operand=RHS operand OR (LHS operand IS NULL AND RHS operand IS NULL)";
   (b) transforming the predicate into a simple predicate LHS=RHS;
   (c) marking the predicate as defining a possible simultaneous presence of a NULL value in the LHS and RHS operand, thereby enabling an optimizer to allow all join methods and access methods; and
   (c) executing the query in the computer to retrieve data from the relational database such that the marked predicate is TRUE in a presence of a NULL value in the LHS and RHS operand.

37. The method according to claim 36, wherein the executing the query step comprises the following steps:
- determining whether the predicate is marked;
- checking the LHS and RHS operand for nullness; and
- interpreting the predicate as TRUE, in a presence of a NULL value in the LHS and RHS operand.

38. The method according to claim 36, wherein the query predicate marking step is applied during a query plan optimization phase of query processing.

39. The method according to claim 36, wherein the query predicate marking step is applied during a query rewrite phase of query processing.

* * * * *